United States Patent Office 2,776,979
Patented Jan. 8, 1957

2,776,979

1-NITROSO-2-IMIDAZOLIDONE AND PROCESS

Julian G. Michels, Norwich, N. Y., assignor to The Norwich Pharmacal Company, Norwich, N. Y., a corporation of New York No Drawing. Application April 5, 1956,
Serial No. 576,236

2 Claims. (Cl. 260—309.7)

This invention relates to a new method of preparing 1-amino-2-imidazolidone and to a new chemical compound which is useful in carrying out my new method. My new compound is 1-nitroso-2-imidazolidone, described by the formula:

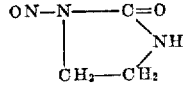

The compound 1-amino-2-imidazolidone is useful as an intermediate in the preparation of N-(5-nitro-2-furfurylidene)-1-amino-2-imidazolidone (see pending application Serial No. 511,435 filed May 26, 1955, and owned by the assignee of this application). N-(5-nitro-2-furfurylidene)-1-amino-2-imidazolidone is a chemotherapeutic agent which is effective in the treatment of animals lethally infected with representative species of both gram-negative and gram-positive organisms. For instance, when it is administered orally in sub-toxic amounts to animals infected with *Salmonella typhosa*, *Salmonella choleraesius* or *Streptococcus pyogenes* organisms, a high order of protection is obtained.

The preparation of 1-amino-2-imidazolidone was, prior to my invention, both cumbersome and expensive since it was necessary that a tedious multi-step process be carried out. I have discovered that it is possible to prepare 1-amino-2-imidazolidone in a much simpler and more direct manner and at a substantial saving over the prior process. The starting material which I use in the practice of my new method is 2-imidazolidone, a comparatively inexpensive compound which is available in plentiful supply.

1-amino-2-imidazolidone is readily prepared according to my new method by nitrosating 2-imidazolidone and then reducing the nitroso derivative. This can be done by dissolving the 2-imidazolidone in a mineral acid such as hydrochloric acid and slowly adding thereto an alkaline nitrite such as sodium nitrite at a temperature of about 0–5° C. This simple procedure produces my new compound, 1-nitroso-2-imidazolidone, in good yield as a readily handled precipitate which can be easily reduced to give the amino derivative. The reduction of my new compound can be effected by known methods. The one which I now prefer, because of its simplicity and low cost, is that involving the use of zinc dust in dilute mineral acid solution.

In the preparation of the chemotherapeutic agent, N-(5-nitro-2-furfurylidene)-1-amino-2-imidazolidone, from 1-amino-2-imidazolidone prepared according to my new method, that intermediate need not be isolated from its solution. The addition to said solution of 5-nitro-2-furfural or a reactive derivative thereof produces the desired end product in excellent yield.

The preparation of my new compound, the steps which are followed in the practice of my new method and the production of N-(5-nitro-2-furfurylidene)-1-amino-2-imidazolidone from the 1-amino-2-imidazolidone prepared through my new method may be depicted schematically as follows:

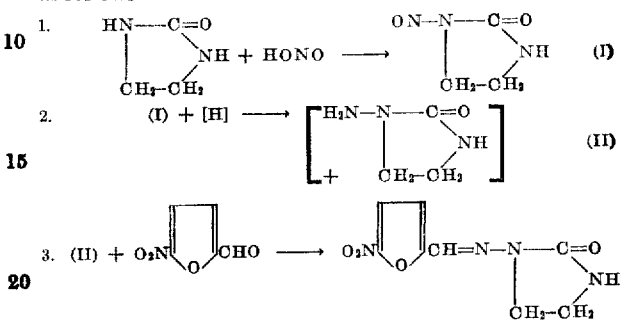

In order that my invention may be fully available to those skilled in the art, the following illustrative example is given:

Example

To a solution of 4.2 g. (.05 mole) of 2-imidazolidone in 50 cc. of 1 N hydrochloric acid, are added slowly with stirring at about 0° C., 3.5 g. (.05 mole) of sodium nitrite. When about ⅔ of the nitrite has been added, a precipitate forms. After the remainder of the nitrite is added, the suspension is stirred for about one hour. This precipitate is filtered and washed with cold water. There are obtained 3.6 g. (61%) of crystalline solid, 1-nitroso-2-imidazolidone, that melts with decomposition at about 95° C.

The 3.6 g. (.0313 mole) of 1-nitroso-2-imidazolidone are dissolved in 150 cc. of 10% hydrochloric acid and cooled to 2° C. To this solution maintained at about 10° C. are added in small portions 4.4 g. (.0673 mole) of zinc dust. The temperature is allowed to rise to 20° C. and the excess zinc is filtered. The addition of a solution of 4.5 g. (.032 mole) of 5-nitro-2-furfural in alcohol to the clear colorless filtrate, results in the formation of an orange colored precipitate. This product is filtered, washed with water, alcohol and ether and dried to give 4.75 g. (68%) of N-(5-nitro-2-furfurylidene)-1-amino-2-imidazolidone which melts with decomposition at 253–259° C. Recrystallization from nitromethane using charcoal yields the pure compound melting with decomposition at 261–263° C.

What I claim is:

1. The method of preparing 1-amino-2-imidazolidone which comprises nitrosating 2-imidazolidone by dissolving said 2-imidazolidone in hydrochloric acid and slowly adding sodium nitrite thereto at a temperature of about 0° to 5° C. to produce 1-nitroso-2-imidazolidone, and then reducing said 1-nitroso-2-imidazolidone by dissolving the same in dilute mineral acid and adding zinc dust thereto.

2. 1-nitroso-2-imidazolidone represented by the formula:

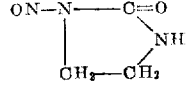

No references cited.

Disclaimer 2,776,979.—*Julian G. Michels*, Norwich, N. Y. 1-NITROSO-2-IMIDAZOLIDONE AND PROCESS. Patent dated Jan. 8, 1957. Disclaimer filed Mar. 29, 1957, by the assignee, *The Norwich Pharmacal Company*.
Hereby enters this disclaimer to claim 2 of said patent.
[*Official Gazette April 23, 1957.*]